(12) United States Patent
Choi et al.

(10) Patent No.: US 11,794,781 B2
(45) Date of Patent: Oct. 24, 2023

(54) AUTONOMOUS CONTROLLER FOR DETECTING A LOW-SPEED TARGET OBJECT IN A CONGESTED TRAFFIC SITUATION, A SYSTEM INCLUDING THE SAME, AND A METHOD THEREOF

(71) Applicants: HYUNDAI MOTOR COMPANY, Seoul (KR); KIA MOTORS CORPORATION, Seoul (KR)

(72) Inventors: Jin Ha Choi, Suwon-si (KR); Bhimsen Joshi, Hyderabad (IN); Sripad Jangam, Hyderabad (IN)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 153 days.

(21) Appl. No.: 16/922,746

(22) Filed: Jul. 7, 2020

(65) Prior Publication Data

US 2021/0380136 A1 Dec. 9, 2021

(30) Foreign Application Priority Data

Jun. 3, 2020 (IN) .............................. 202011023231

(51) Int. Cl.
*B60W 60/00* (2020.01)
*B60W 30/095* (2012.01)
*B60W 30/09* (2012.01)

(52) U.S. Cl.
CPC ........ *B60W 60/0016* (2020.02); *B60W 30/09* (2013.01); *B60W 30/0956* (2013.01);
(Continued)

(58) Field of Classification Search
None
See application file for complete search history.

(56) References Cited

U.S. PATENT DOCUMENTS 9,937,905 B2 * 4/2018 Kim .................. B60W 30/0953
2016/0104381 A1 * 4/2016 Nath ...................... G08G 1/167
701/23
(Continued)

FOREIGN PATENT DOCUMENTS

JP 5870985 B2 * 3/2016 ................ B60T 7/22

OTHER PUBLICATIONS

Machine translation of the description of Jp 5870985B2 from EPO (Year: 2016).*
(Continued)

*Primary Examiner* — Isaac G Smith
*Assistant Examiner* — Jennifer M Anda
(74) *Attorney, Agent, or Firm* — LEMPIA SUMMERFIELD KATZ LLC

(57) ABSTRACT

An autonomous controller, a system including the same, and a method thereof include a processor that detects a target object attempting to cut in at a low speed during autonomous driving and that performs response control. The controller, system, and method include a storage storing data and an algorithm for detecting the target object and performing the response control. The processor calculates a final distance value on the basis of a point tracking a distance between a host vehicle and the target object and compares the final distance value with a predetermined threshold to determine whether the target object cuts in.

16 Claims, 14 Drawing Sheets

(52) U.S. Cl.
CPC . *B60W 2420/54* (2013.01); *B60W 2554/4026* (2020.02); *B60W 2554/80* (2020.02)

(56) References Cited

U.S. PATENT DOCUMENTS

| | | |
|---|---|---|
| 2018/0162387 A1* | 6/2018 | Sung ...................... B60W 30/09 |
| 2019/0263344 A1* | 8/2019 | Yokoi ............... B60W 30/0956 |
| 2019/0266421 A1* | 8/2019 | Kim ........................ H04N 7/188 |
| 2020/0226930 A1* | 7/2020 | Shimbo ............. G06K 9/00805 |
| 2021/0192955 A1* | 6/2021 | Kang .................... B60W 30/09 |
| 2021/0291822 A1* | 9/2021 | Obi ....................... B60W 10/04 |

OTHER PUBLICATIONS

Office Action cited in corresponding Indian patent application No. 202011023231; dated Mar. 23, 2023; 5 pp.

* cited by examiner

AUTONOMOUS CONTROLLER FOR DETECTING A LOW-SPEED TARGET OBJECT IN A CONGESTED TRAFFIC SITUATION, A SYSTEM INCLUDING THE SAME, AND A METHOD THEREOF

CROSS-REFERENCE TO RELATED APPLICATION

This application claims the benefit of priority to the Indian Patent Application No. 202011023231, filed in the Indian Intellectual Property Office on Jun. 3, 2020, the entire contents of which are incorporated herein by reference.

TECHNICAL FIELD

The present disclosure relates to an autonomous controller, a system including the same, and a method thereof.

More particularly, the present disclosure relates to technologies of accurately detecting a target object in a low-speed situation during autonomous driving and performing control in response to the target object.

BACKGROUND

With the development of the auto industry, an autonomous system and a driving assistance system, which facilitate partially autonomous driving (hereinafter, for convenience of description, both autonomous driving and driving assistance are referred to as "autonomous driving"), have been developed.

The autonomous system may provide a variety of functions, for example, setting speed keeping, vehicle-to-vehicle distance keeping, lane keeping, and a lane change. The autonomous system may perform autonomous driving using various devices, such as a sensor for sensing environments outside the vehicle, a sensor for sensing information about the vehicle, a global positioning system (GPS), a detailed map, a driver state monitoring system, a steering actuator, an acceleration/deceleration actuator, a communication circuit, and a control circuit (e.g., an electronic control unit (ECU)).

However, it is difficult for such an autonomous system to operate in a situation where low-speed traffic congestion is heavy. In other words, an operation range of a conventional autonomous control system is configured to operate over a predetermined speed.

However, there is a need for detecting a target object in a low-speed congested driving situation, such as traffic congestion, and performing control for responding to the detected target object.

SUMMARY

The present disclosure has been made to solve the above-mentioned problems occurring in the prior art while advantages achieved by the prior art are maintained intact.

An aspect of the present disclosure provides an autonomous controller for a vehicle for accurately detecting whether a low-speed target object is in a cut-in state in a congested situation and performing vehicle control based on the detected result, a system including the same, and a method thereof.

Another aspect of the present disclosure provides an autonomous controller for a vehicle for accurately detecting a type of a low-speed target object in a congested situation and performing vehicle control based on the detected result, a system including the same, and a method thereof.

The technical problems to be solved by the present inventive concept are not limited to the aforementioned problems, and any other technical problems not mentioned herein should be clearly understood from the following description by those having ordinary skill in the art to which the present disclosure pertains.

According to an aspect of the present disclosure, an autonomous controller may include: a processor that detects a target object attempting to cut in at a low speed during autonomous driving and perform response control and a storage storing data and an algorithm for detecting the target object and performing the response control. The processor may calculate a final distance value on the basis of a point tracking a distance between a host vehicle and the target object and may compare the final distance value with a predetermined distance value threshold to determine whether the target object is a cut-in state.

In an embodiment, the processor may track distance values to the target object, the tracked distance values respectively measured by a plurality of sensors. The processor may compare the tracked distance values to determine a shortest distance value as the final distance value.

In an embodiment, the processor may control the host vehicle depending on whether the target object is in the cut-in state.

In an embodiment, the processor may determine whether the final distance value is less than or equal to a predetermined first threshold and may determine that the target object is in the cut-in state when the final distance value is less than or equal to the first threshold.

In an embodiment, the processor may determine whether the final distance value is greater than the first threshold and is less than or equal to a second threshold and may determine that the target object is in an approach state when the final distance value is greater than the first threshold and is less than or equal to the second threshold.

In an embodiment, the processor may determine whether the final distance value is greater than the second threshold and is less than or equal to a third threshold and may determine that the target object is in a monitoring state for monitoring approach when the final distance value is greater than the second threshold and is less than or equal to the third threshold.

In an embodiment, the processor may perform stop control of the host vehicle when the target object is in the cut-in state, may perform deceleration control of the host vehicle when the target object is in the approach state, and may continue tracking a distance between the host vehicle and the target object when the target object is in the monitoring state.

In an embodiment, the processor may calculate reflection values for each of a plurality of sensors with respect to the target object based on sensed information.

In an embodiment, the processor may compare the reflection values for each of the plurality of sensors to determine a type of the target object.

In an embodiment, the processor may control the host vehicle using at least one of whether the target object is in the cut-in state, a movement angle of the target object, a relative speed of the target object, and the type of the target object.

In an embodiment, the processor may determine the target object as a vehicle when the reflection values for each of the plurality of sensors are greater than or equal to a predetermined reflection value threshold and may determine the target object as a two-wheeled vehicle or a pedestrian depending on a difference between the reflection values for each of the plurality of sensors.

In an embodiment, the processor may perform deceleration control of the host vehicle when the target object is a vehicle and may perform stop control of the host vehicle when the target object is a two-wheeled vehicle.

According to another aspect of the present disclosure, a system may include: a sensing device that senses information of a target object around a host vehicle. The system may further include an autonomous controller that detects the target object attempting to cut in at a low speed during autonomous driving and performs response control, based on the sensed information of the sensing device. The autonomous controller may calculate a final distance value on the basis of a point tracking a distance between the host vehicle and the target object and may compare the final distance value with a predetermined threshold to determine whether the target object is in a cut-in state.

In an embodiment, the sensing device may include a plurality of ultrasonic sensors.

In an embodiment, the plurality of sensors may be located on front portions and corners of the host vehicle.

In an embodiment, the autonomous controller may calculate a first distance value being a distance from a first sensor among the plurality of ultrasonic sensors to the target object, may calculate a second distance value being a distance from a second sensor among the plurality of ultrasonic sensors to the target object, and may track the first distance value and the second distance value during a predetermined time.

In an embodiment, the autonomous controller may compare a first tracking value obtained by tracking the first distance value during the predetermined time with a second tracking value obtained by tracking the second distance value during the predetermined time and may determine a smaller value between the first tracking value and the second tracking value as the final distance value.

In an embodiment, the autonomous controller may calculate reflection values of the plurality of ultrasonic sensors for the target object and may determine a type of the target object using the reflection values.

According to another aspect of the present disclosure, an autonomous control method may include: sensing a distance between a host vehicle and a target object based on a plurality of sensors during low-speed driving, tracking distance values between the host vehicle and the target object, and determining whether the target object is in a cut-in state, using the tracked distance values.

In an embodiment, the autonomous control method may further include calculating reflection values of the plurality of sensors with respect to the target object, determining a type of the target object using the reflection values of the plurality of sensors, and controlling the host vehicle using at least one of whether the target object is in the cut-in state, a movement angle of the target object, a relative speed of the target object, and the type of the target object.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
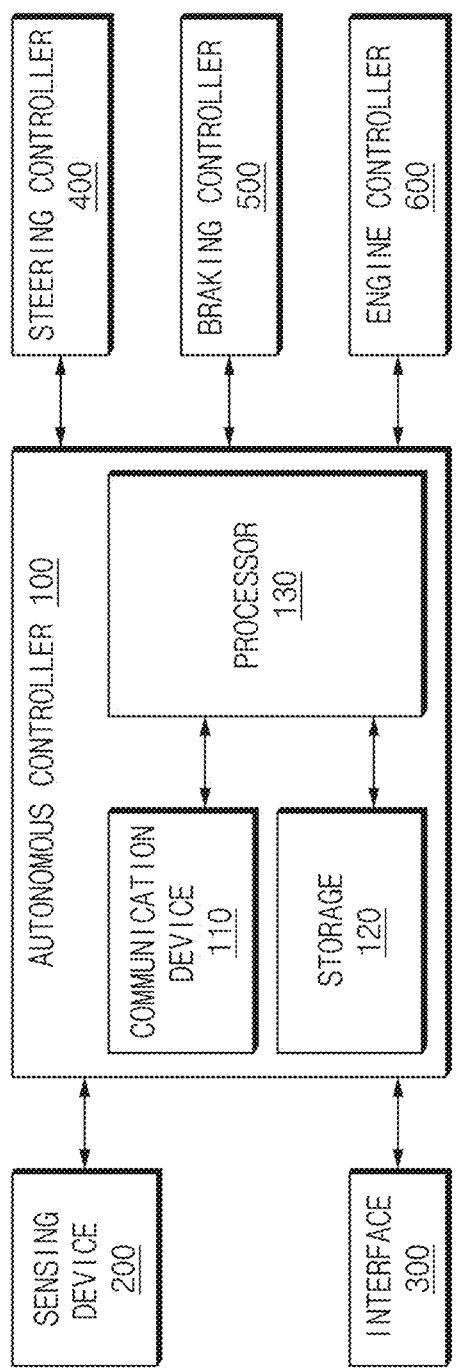
FIG. 1 is a block diagram illustrating a configuration of a vehicle system including an autonomous controller according to an embodiment of the present disclosure.

Hereinafter, some embodiments of the present disclosure are described in detail with reference to the drawings. In adding the reference numerals to the components of each drawing, it should be noted that the identical or equivalent components are designated by the identical numerals even when the components are displayed on other drawings. Further, in describing the embodiment of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those having ordinary skill in the art to which the present disclosure pertains. Such terms as those defined in a generally used dictionary should be interpreted as having meanings identical to the contextual meanings in the relevant field of art. Such terms should not be interpreted as having ideal or excessively formal meanings unless clearly defined as having such meanings in the present application.

Hereinafter, embodiments of the present disclosure are described in detail with reference to FIGS. 1 to 14. When a component, device, or element of the present disclosure is described as having a purpose or performing an operation, function, or the like, the component, device, or element should be considered herein as being "configured to" meet that purpose or to perform that operation, function, or the like.

Further, the controller described herein, and the corresponding processor or processors, may be programmed to perform the noted operation, function, operation, or the like.

Figure 2:
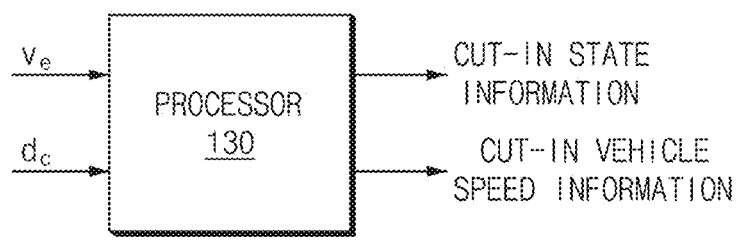
FIG. 2 is a block diagram illustrating an autonomous controller according to an embodiment of the present disclosure.
Figure 3:
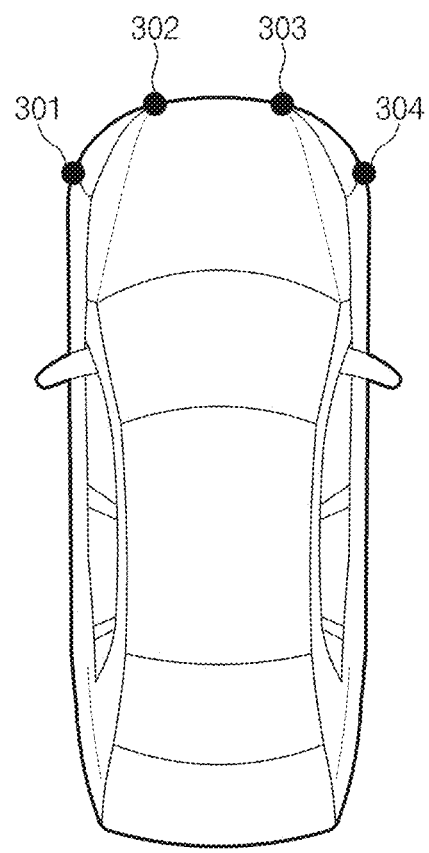
FIG. 3 is a drawing illustrating an example where a sensing device is installed in a vehicle according to an embodiment of the present disclosure.

FIG. 1 is a block diagram illustrating a configuration of a vehicle system including an autonomous controller according to an embodiment of the present disclosure. FIG. 2 is a block diagram illustrating an autonomous controller according to an embodiment of the present disclosure. FIG. 3 is a drawing illustrating an example where a sensing device is installed in a vehicle according to an embodiment of the present disclosure.

Referring to FIG. 1, the vehicle system according to an embodiment of the present disclosure may include an autonomous controller 100, a sensing device 200, an interface 300, a steering controller 400, a braking controller 500, and an engine controller 600.

The autonomous controller 100 according to an embodiment of the present disclosure may be implemented in a host vehicle. In this embodiment, the autonomous controller 100 may be integrally configured with control units in the host vehicle or may be implemented as a separate device to be connected with the control units of the host device by a separate connection means.

The autonomous controller 100 may detect a target object, which attempts to cut in at a low speed during autonomous driving, to perform response control. Particularly, the autonomous controller 100 may calculate a final distance value on the basis of a point tracking a distance between the host vehicle and a target object and may compare the final distance value with a predetermined threshold to determine whether the target object is in a cut-in state.

The autonomous controller 100 may include a communication device 110, a storage 120, and a processor 130.

The communication device 110 may be a hardware device implemented with various electronic circuits to transmit and receive a signal through a wireless or wired connection. In an embodiment of the present disclosure, the communication device 110 may be implemented with network communication technology in the vehicle. Herein, the network communication technology in the vehicle may be configured to perform inter-vehicle communication through controller area network (CAN) communication, local interconnect network (LIN) communication, flex-ray communication, or the like. As an example, the communication device 110 may perform communication with the sensing device 200, the interface 300, the steering controller 400, the braking controller 500, and the engine controller 600.

The storage 120 may store a sensing result of the sensing device 200 and data, algorithms, and/or the like necessary for an operation of the processor 130.

As an example, the storage 120 may store a reflection value by an ultrasonic sensor, a distance value from a surrounding vehicle, or a threshold which is preset by an experimental value. Furthermore, the storage 120 may store information associated with an obstacle sensed by the sensing device 200, for example, distance information from the obstacle, or the like.

The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The processor 130 may be electrically connected with the communication unit 110, the storage 120, or the like and may electrically control the respective components. The processor 130 may be an electrical circuit which executes instructions of software and may perform a variety of data processing and calculation described below.

The processor 130 may process a signal delivered between the respective components of the autonomous controller 100. The processor 130 may be, for example, an electronic control unit (ECU), a micro controller unit (MCU), or another sub-controller, which is loaded into the vehicle.

As shown in FIG. 2, the processor 130 may calculate cut-in state information (e.g., a cut-in state, an approach state, a monitoring state, or the like), cut-in vehicle speed information, or the like using a host vehicle speed $V_e$, a threshold $d_c$, or the like.

The processor 130 may calculate a final distance value on the basis of a point tracking a distance between the host vehicle and a target object and may compare the final distance value with a predetermined threshold to determine whether the target object is in a cut-in state. In other words, the processor 130 may track distance values to the target object, which are respectively measured by a plurality of sensors, and may compare the tracked distance values to determine the shortest distance value as the final distance value. In this embodiment, when the plurality of sensors, which are ultrasonic sensors, provide sensing values to the target object to the processor 130, the processor 130 may calculate a distance value to the target object for each sensor.

The processor 130 may control the host vehicle depending on whether the target object is in the cut-in state. When the target object is in the cut-in state, the processor 130 may perform stop control of the host vehicle. When the target object is an approach state, the processor 130 may perform deceleration control of the host vehicle. When the target object is in a monitoring state, the processor 130 may continue tracking a distance between the host vehicle and the target object.

Furthermore, the processor 130 may determine whether the final distance value is less than or equal to a predetermined first threshold. When the final distance value is less than or equal to the first threshold, the processor 130 may determine that the target object in the cut-in state. The processor 130 may determine whether the final distance value is less than or equal to a second threshold greater than the first threshold. When the final distance value is greater than the first threshold and is less than or equal to the second threshold, the processor 130 may determine that the target object is in the approach state. The processor 130 may determine whether the final distance value is less than or equal to a third threshold greater than the second threshold. When the final distance value is greater than the second threshold and is less than or equal to the third threshold, the processor 130 may determine that the target object is in the monitoring state of monitoring approach.

In this embodiment, the first threshold, the second threshold, and the third threshold may be preset by experimental values and may then be stored in the storage 120.

The processor 130 may calculate reflection values for each of the plurality of sensors with respect to the target object based on sensed information and may compare the reflection values for each of the plurality of sensors to determine a type of the target object.

The reflection value may refer to an amount of an ultrasonic wave transmitted by an ultrasonic sensor and reflected and returned by the target object. In this embodiment, when a vehicle has flat sides, each of which has a certain size and are formed of the same material as each other, the reflection values by two ultrasonic sensors may be similar to each other. However, when the target object is a two-wheeled vehicle, such as a bicycle, a first portion of the target object, from which an ultrasonic wave by a first sensor is reflected, and a second portion of the target object, from which an ultrasonic wave by a second sensor is reflected, may vary in material and shape. Thus, a difference between reflection values may result. In this embodiment, when the difference between the reflection values is very large, the target object may be a pedestrian or in an error state.

As such, when reflection values for each of the plurality of sensors are greater than or equal to a predetermined threshold, the processor 130 may determine the target object as a vehicle. The processor 130 may determine the target object as a bicycle or a pedestrian depending on a difference between the reflection values for each of the plurality of sensors. When the target object is the vehicle, the processor 130 may perform deceleration control of the host vehicle. When the target object is the bicycle, the processor 130 may perform stop control of the host vehicle.

Furthermore, the processor 130 may control the host vehicle using at least one of a movement angle of the target object, a relative speed of the target object, and a type of the target object.

For example, when the relative speed of the target object is very fast and when the movement angle of the target object is expected to collide with the host vehicle within a short time, the processor 130 may perform deceleration or stop control of the host vehicle. On the other hand, although the relative speed of the target object is very slow and although the movement angle of the target object is not expected to collide with the host vehicle within a short time, when the target object is a two-wheeled vehicle, the processor 130 may perform deceleration or stop control of the host vehicle. This is because it is possible for the two-wheeled vehicle to suddenly increase in speed or suddenly cut in.

The sensing device 200 may include one or more sensors, each of which detects an object located around the host vehicle, for example, a target object, and measures a distance from the target object and/or a relative speed of the target object.

To this end, the sensing device 200 may include a plurality of sensors 301 to 304 as shown in FIG. 3. In this embodiment, the sensors 302 and 303 located on front portions of the host vehicle and the sensors 301 and 304 located on corners of the host vehicle may include ultrasonic sensors or short-range radars. The sensors 302 and 303 may be implemented to be able to move to sense objects at sides of the host vehicle.

Furthermore, the sensing device 200 may obtain information associated with a location of an object around the host vehicle, a speed of the object around the host vehicle, a movement direction of the object around the host vehicle, and/or a type (e.g., a vehicle, a pedestrian, a bicycle, a motorcycle, or the like) of the object around the host vehicle. To this end, the sensing device 200 may further include a radar, a camera, a laser scanner and/or a corner radar, a light detection and ranging (LiDAR), an acceleration sensor, a yaw rate sensor, a torque sensor and/or a wheel speed sensor, a steering angle sensor, or the like as well as the ultrasonic sensor.

The interface 300 may include an input means for receiving a control command from a user and an output means for outputting an operation state, an operation result, or the like of the autonomous controller 100.

Herein, the input means may include a key button and may further include a mouse, a joystick, a jog shuttle, a stylus pen, or the like. Furthermore, the input means may further include a soft key implemented on a display.

The output means may include the display and may further include a voice output means, such as a speaker. In this embodiment, a touch sensor, such as a touch film, a touch sheet, or a touch pad, is provided in the display, the display operates as a touchscreen and may be implemented in a form where the input means and the output means are integrated with each other.

In this embodiment, the display may include at least one of a liquid crystal display (LCD), a thin film transistor-LCD (TFT-LCD), an organic light-emitting diode (OLED) display, a flexible display, a field emission display (FED), or a three-dimensional (3D) display.

The steering controller 400 may be configured to control a steering angle of the host vehicle and may include a steering wheel, an actuator interlocked with the steering wheel, and a controller for controlling the actuator.

The braking controller 500 may be configured to control braking of the host vehicle and may include a controller for controlling a brake.

The engine controller 600 may be configured to control to drive an engine of the host vehicle and may include a controller for controlling a speed of the host vehicle.

As such, an embodiment of the present disclosure may accurately detect whether a low-speed target object is in a cut-in state in a congested situation, may detect a type of the low-speed target object, and may consider a degree to which the target object cuts in, a type of the target object, a relative speed of the target object, a movement angle of the target object, and the like in an overall manner to control the host vehicle. Thus, an accident caused by a cut-in vehicle, which is traveling at a low speed, may be prevented.

Figure 4:
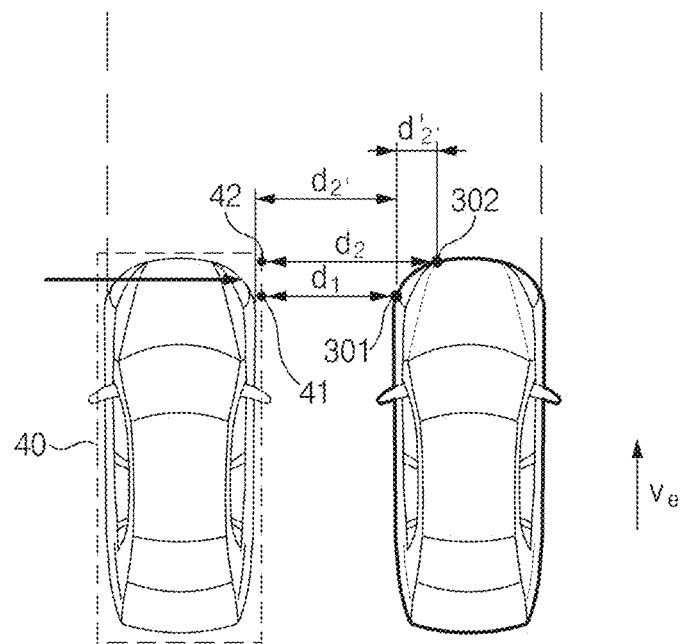
FIG. 4 is a drawing illustrating a screen for describing a distance between a host vehicle and a target object according to an embodiment of the present disclosure.
Figure 5:
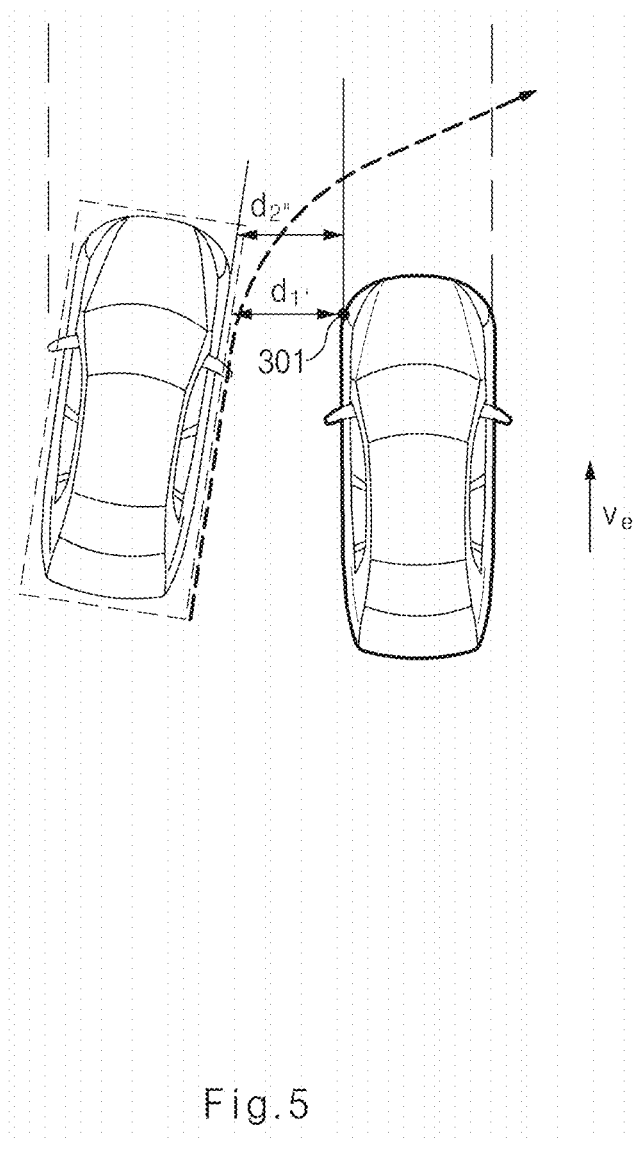
FIG. 5 is a drawing illustrating a screen for describing a change in a distance between a host vehicle and a target object as the target object moves, according to an embodiment of the present disclosure.
Figure 6:
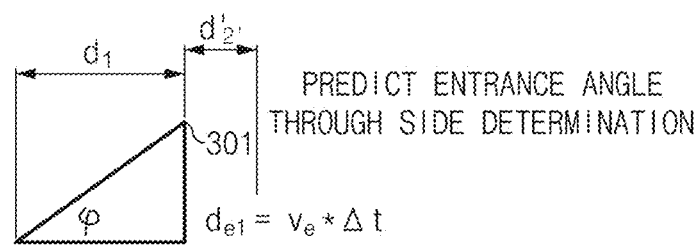
FIG. 6 is a drawing illustrating a method for calculating a movement angle of a target object according to an embodiment of the present disclosure.
Figure 7:
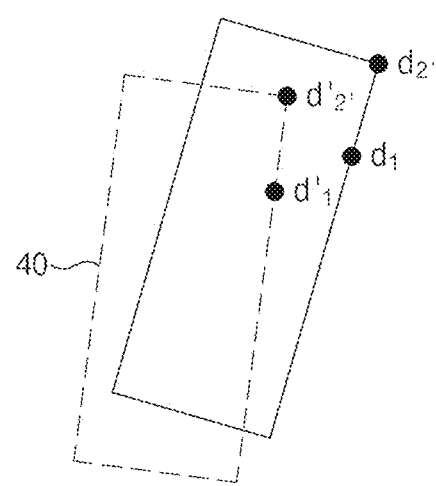
FIG. 7 is a drawing illustrating a point change according to movement of a target object according to an embodiment of the present disclosure.

FIG. 4 is a drawing illustrating a screen for describing a distance between a host vehicle and a target object according to an embodiment of the present disclosure. FIG. 5 is a drawing illustrating a screen for describing a change in a distance between a host vehicle and a target object as the target object moves, according to an embodiment of the present disclosure. FIG. 6 is a drawing illustrating a method for calculating a movement angle of a target object according to an embodiment of the present disclosure. FIG. 7 is a drawing illustrating a point change according to movement of a target object according to an embodiment of the present disclosure.

Referring to FIG. 4, respective sensors loaded into a host vehicle may measure distances between the host vehicle and a target object.

$D_n$ refers to the distance between the host vehicle and the target object, $V_e$ refers to the speed of the host vehicle, and $\phi$ refers to the entrance angle of the target object.

$$D_n = \text{Track}(d_n, d'_n, d''_n) \qquad \text{[Equation 1]}$$

In Equation 1 above, $D_n$ refers to a value obtained by tracking a distance from the target object at a predetermined number of times n during a predetermined time. In other words, $D_n$ may be a tracking value for $d_1$, $d_{1'}$, and $d_{1''}$.

Furthermore, $d_1$ may refer to a distance between a front first sensor and the target object, and $d_{1'}$ may refer to a value estimated through $d_1$. In FIG. 4, to track the shortest distance, a first distance $d_1$ may be obtained from a first point 41 to a location of a first sensor 301. The first point 41 is a point converging with a side of a box 40 of a target object by drawing a line perpendicular to the location of the first sensor 301. A second distance $d_2$ may be obtained from a second point 42 to a location of a second sensor 302. The second point 42 is a point converging with the side of the box 40 of the target box 40 by drawing a line perpendicular to the location of the second sensor 302. Thus, a distance from the location of the first sensor 301, rather than the location of the second sensor 302, to the second point 42 may be estimated as $d_{2'}$.

Thus, an autonomous controller 100 of FIG. 1 may determine a shortest distance value between a value $d_{1'}$ tracking the distance $d_1$ and a value $d_{2''}$ tracking the distance $d_{2'}$ as a final distance value $d_f$.

It may be seen that the distance $d_{2'}$ becomes short as the target object approaching the host vehicle in FIG. 4 rotates to the front of the host vehicle to cut in as shown in FIG. 5.

As shown in FIG. 6, an entrance angle φ may be calculated using $D_{e1}$ as Equation 2 below through side determination. In this embodiment, $D_{e1}$ refers to the distance where the host vehicle is moved, $V_e$ refers to the speed of the host vehicle, and Δt refers to the movement time of the host vehicle. $D_1$ and $D_2$ can be derived from equation 1.

$$\phi = \tan^{-1}(D_{e1}/(D_1 - D_{2'})) D_{e1} = v_e * \Delta t \quad \text{[Equation 2]}$$

$$V_{hr} = (D_1 - D_{2'})/\Delta t \quad \text{[Equation 3]}$$

$$V_{vr} = V_{hr} * \tan(\phi) \quad \text{[Equation 4]}$$

$$V_{cv} = V_{vr} + V_e \quad \text{[Equation 5]}$$

$$V_t = V_{cv} * \sin(\phi) \quad \text{[Equation 6]}$$

In Equation 3 above, $V_{hr}$ is a speed where the target object is horizontally moved during a time when the host vehicle is moved. $V_{vr}$ is an estimated relative speed. In other words, the relative speed $V_{vr}$ of the target object may be calculated using a horizontal speed of the target object and a movement angle of the target object as shown in FIG. 4.

$V_{cv}$, which is a vertical speed of the target object, may be calculated by adding the horizontal speed of the target object and a speed of the host vehicle. Thus, as shown in FIG. 6, a final speed $V_t$ of the target object may be calculated by multiplying the vertical speed $V_{cv}$ of the target object by sin φ.

Meanwhile, as shown in FIG. 7, the autonomous controller 100 may determine a type of the target object based on the amount of reflection through tracking of points ($d'_1$, $d_1$, $d'_2$, $d'_{2'}$) for determining sides of the host vehicle.

Figure 8:
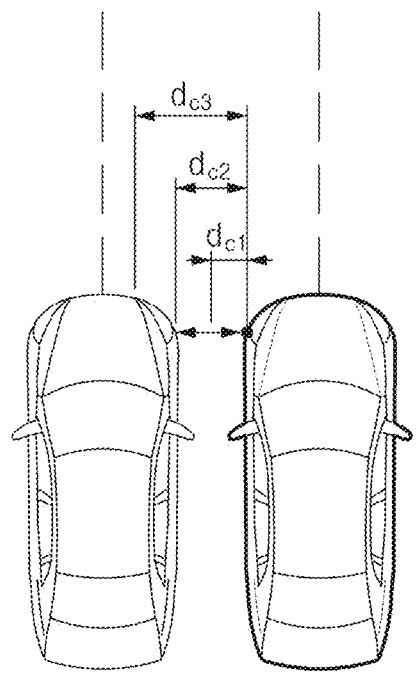
FIG. 8 is a drawing illustrating an example of setting a reference value according to an embodiment of the present disclosure.

FIG. 8 is a drawing illustrating an example of setting a reference value according to an embodiment of the present disclosure.

As shown in FIG. 8, a first threshold $d_{c1}$ may be set to be less than a second threshold $d_{c2}$, and the second threshold $d_{c2}$ may be set to be less than a third threshold $d_{c3}$. The first threshold $d_{c1}$, the second threshold $d_{c2}$, and the third threshold $d_{c3}$ may be preset by experimental values.

When a distance between a host vehicle and a target object is less than or equal to the third threshold $d_{c3}$, an autonomous controller 100 of FIG. 1 may continue monitoring whether the target object is cutting in front of the host vehicle. When the distance between the host vehicle and the target object is less than or equal to the second threshold $d_{c2}$, the autonomous controller 100 may determine that the target object is approaching the host vehicle to perform deceleration control of the host vehicle. Furthermore, when the distance between the host vehicle and the target object is less than or equal to the first threshold $d_{c1}$, the autonomous controller 100 may determine that the target object is cutting in front of the host vehicle to perform stop control of the host vehicle.

Figure 9:
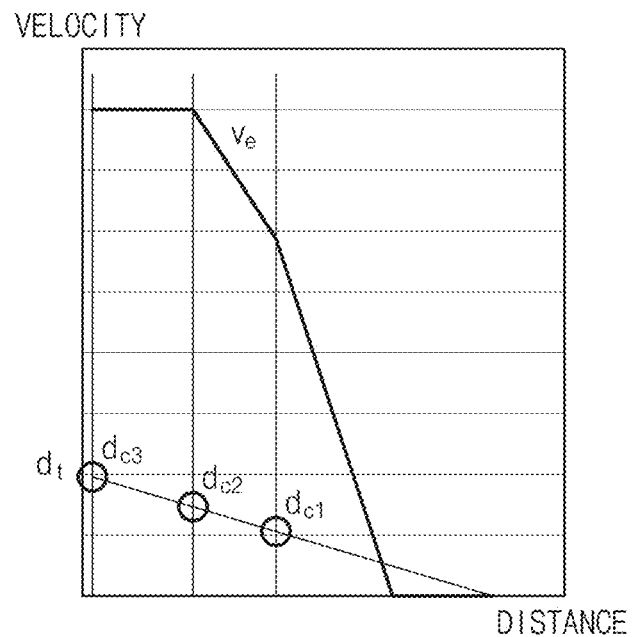
FIG. 9 is a drawing illustrating a change in distance and a change in speed of a host vehicle according to an embodiment of the present disclosure.

FIG. 9 is a drawing illustrating a change in distance and a change in speed of a host vehicle according to an embodiment of the present disclosure.

Referring to FIG. 9, it may be seen that a vehicle speed $V_e$ of the host vehicle becomes 0 to stop the host vehicle when a distance $d_f$ between the host vehicle and a target object is less than or equal to a first threshold $d_{c1}$. Furthermore, it may be seen that the vehicle speed $V_e$ of the host vehicle decelerates when the distance $d_f$ between the host vehicle and the target object is greater than the first threshold $d_{c1}$ and is less than or equal to a second threshold $d_{c2}$.

When the distance $d_f$ between the host vehicle and the target object is greater than the second threshold $d_{c2}$ and is less than or equal to a third threshold $d_{c3}$, the autonomous controller 100 may perform monitoring without controlling a speed of the host vehicle.

Figure 10:
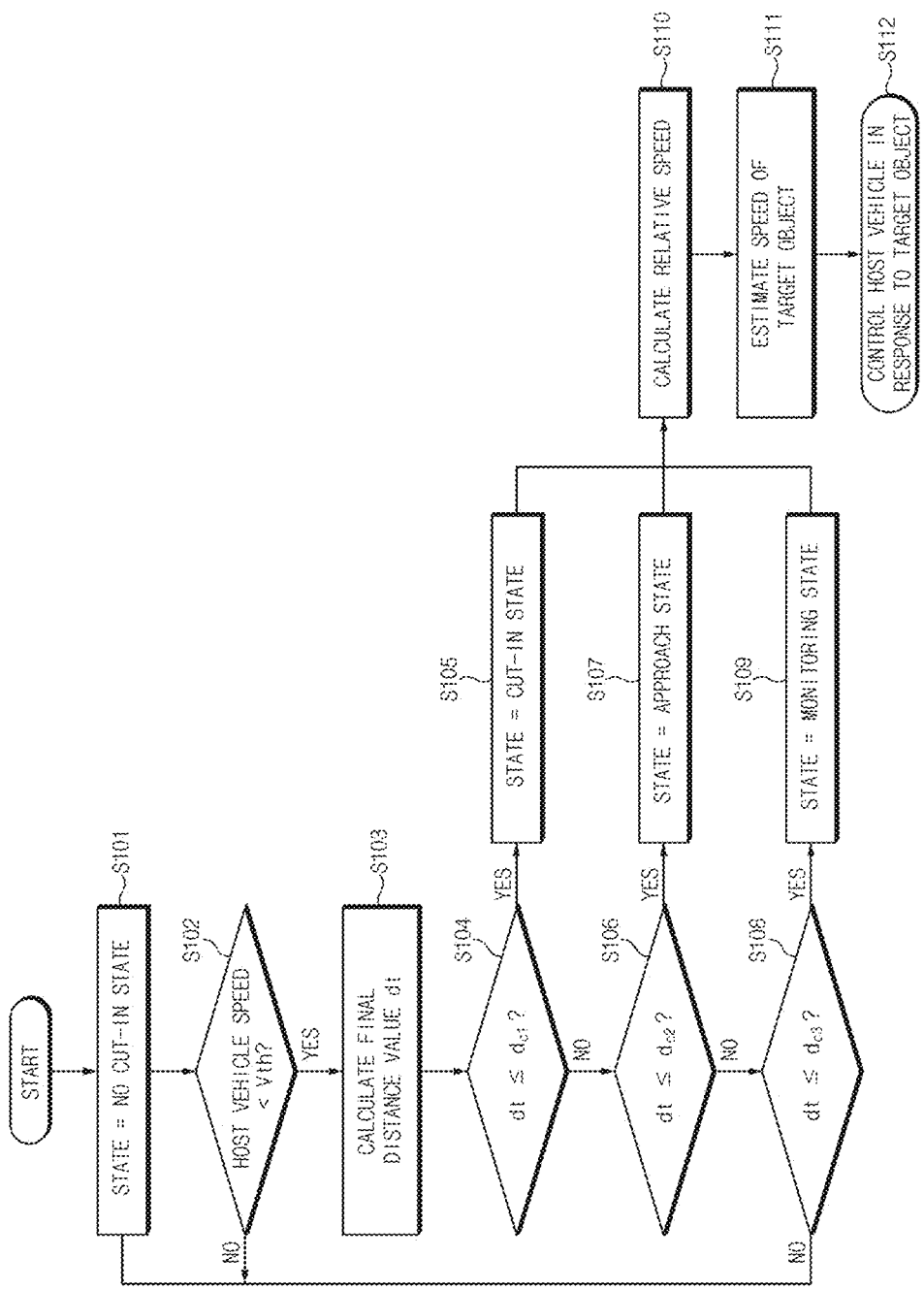
FIG. 10 is a flowchart illustrating an autonomous control method as an autonomous controller detects a low-speed target object, according to an embodiment of the present disclosure.

Hereinafter, a description is given in detail of an autonomous control method according to an embodiment of the present disclosure with reference to FIG. 10. FIG. 10 is a flowchart illustrating an autonomous control method as an autonomous controller detects a low-speed target object, according to an embodiment of the present disclosure.

Hereinafter, it is assumed that an autonomous controller 100 of FIG. 1 performs a process of FIG. 10.

Furthermore, in a description of FIG. 10, an operation described as being performed by an apparatus may be understood as being controlled by a processor 130 of the autonomous controller 100.

Referring to FIG. 10, in S102, the apparatus may determine whether a speed of a host vehicle is less than a predetermined threshold $V_{th}$ in a no cut-in state in S101 during autonomous driving. When the speed of the host vehicle is less than the threshold $V_{th}$, in S103, the apparatus may calculate a final distance value $d_f$ between the host vehicle and a target object among surrounding objects. In this embodiment, the final distance value $d_f$ may refer to a smaller value between a value obtained by tracking a distance from a target object, which is measured by a sensor 301 of FIG. 3, and a value obtained by tracking a distance from the target object, which is measured by a sensor 302 of FIG. 3. Furthermore, the apparatus may select a surrounding object, which enters within a certain distance from the host vehicle, as the target object. The surrounding objects and the target object may be objects which are stopped or are moving and may include a vehicle, a motorcycle, a bicycle, a pedestrian, or the like.

In S104, the apparatus may determine whether the final distance value $d_f$ from the target object is less than or equal to a predetermined first threshold $d_{c1}$. When the final distance value $d_f$ is less than or equal to the first threshold $d_{c1}$, in S105, the apparatus may determine that the target object is in a cut-in state.

On the other hand, when the final distance value $d_f$ is greater than the first threshold $d_{c1}$, in S106, the apparatus may determine whether the final distance value $d_f$ from the target object is less than or equal to a predetermined second threshold $d_{c2}$. When the final distance value $d_f$ is less than or equal to the second threshold $d_{c2}$, in S107, the apparatus may determine that the target object is in an approach state. In other words, when the shortest distance value $d_t$ is greater than the first threshold $d_{c1}$ and is less than or equal to the second threshold $d_{c2}$, the apparatus may determine that the target object is in the approach state.

Furthermore, on the other hand, when the final distance value $d_f$ is greater than the second threshold $d_{c2}$, in S108, the apparatus may determine whether the final distance value $d_f$ from the target object is less than or equal to a predetermined third threshold $d_{c3}$. When the final distance value $d_f$ is less than or equal to the third threshold $d_{c3}$, in S109, the apparatus may determine that the target object is in a monitoring state. In other words, when the shortest distance value $d_t$ is greater than the second threshold $d_{c2}$ and is less than or equal to the third threshold $d_{c3}$, the apparatus may determine that the target object is in the monitoring state.

Herein, the first threshold dci, the second threshold $d_{c2}$, and the third threshold $d_{c3}$ may be constants determined according to a vehicle parameter and may be preset and stored by experimental values.

When the respective states are determined in S105, S107, and S109, in S110, the apparatus may calculate a relative speed of the target object. In S111, the apparatus may estimate a speed of the target object.

In S112, the apparatus may control the host vehicle in response to the target object.

As such, an embodiment of the present disclosure may calculate a distance between the host vehicle and the surrounding vehicle using an ultrasonic sensor during low-speed driving and may determine whether the surrounding vehicle cuts in front of the host vehicle depending on a change in the distance between the host vehicle and the surrounding vehicle to respond to the determined result.

Figure 11:
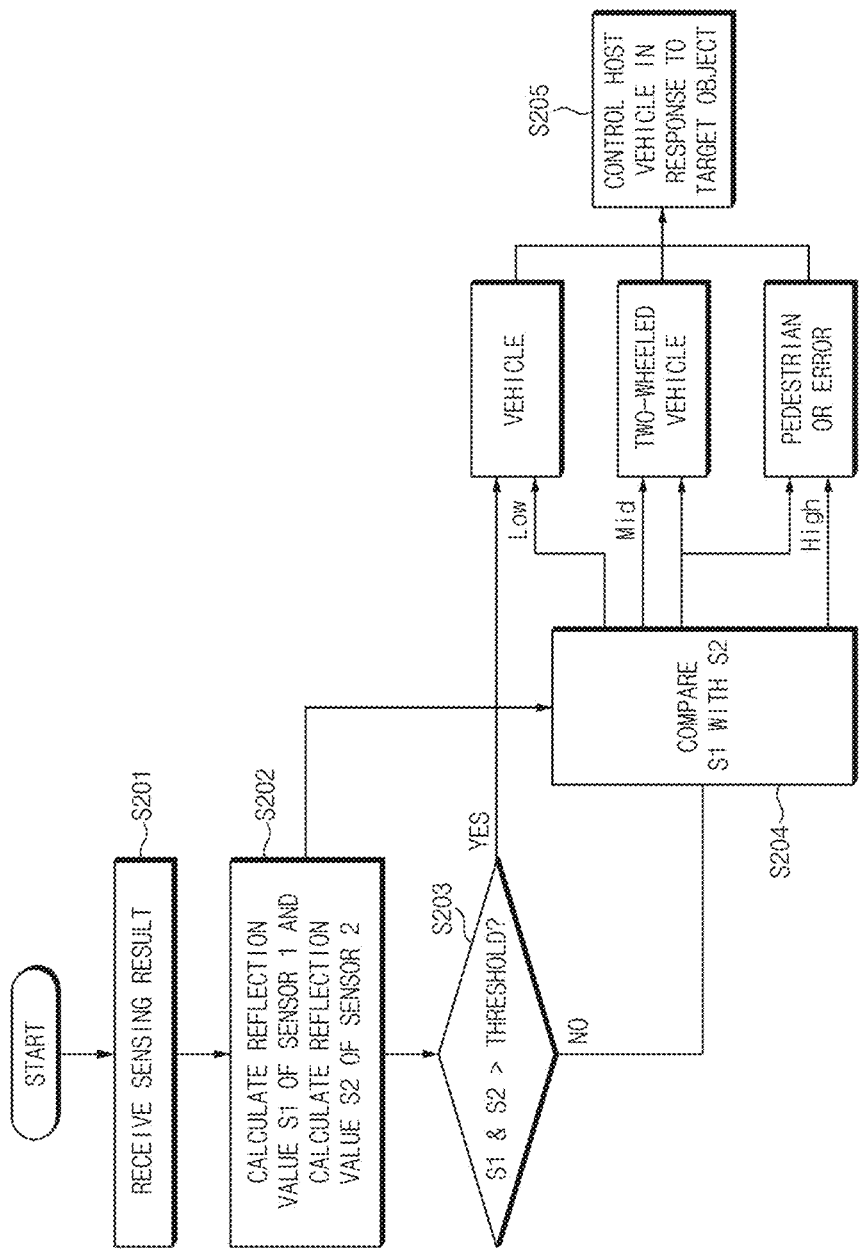
FIG. 11 is a flowchart illustrating an autonomous control method as an autonomous controller recognizes a type of a target object, according to an embodiment of the present disclosure.

Hereinafter, a description is given in detail of an autonomous control method according to an embodiment of the present disclosure with reference to FIG. 11. FIG. 11 is a flowchart illustrating an autonomous control method as an autonomous controller recognizes a type of a target object, according to an embodiment of the present disclosure.

Hereinafter, it is assumed that an autonomous controller 100 of FIG. 1 performs a process of FIG. 11.

Furthermore, in a description of FIG. 11, an operation described as being performed by an apparatus may be understood as being controlled by a processor 130 of the autonomous controller 100.

Referring to FIG. 11, when a sensing result is input from a sensing device 200 of FIG. 1 in S201, in S202, the apparatus may calculate a reflection value for each sensor. In other words, the apparatus may calculate a reflection value S1 of sensor 1 and may calculate a reflection value S2 of sensor 2. In this embodiment, the reflection value for each sensor may refer to the amount of reflection when a signal is reflected and returned after each sensor transmits the signal. In other words, the amount of reflection of an ultrasonic signal transmitted by an ultrasonic sensor may vary depending on shape and material of a reflection target object. In this embodiment, sensor 1 may be a corner sensor 301, and sensor 2 may be a front sensor 302.

In S203, the apparatus may determine whether both of the calculated reflection values are greater than a predetermined threshold.

When both the calculated reflection values are greater than the predetermined threshold, the apparatus may determine the target object as a vehicle.

On the other hand, when at least one of the calculated reflection values is less than or equal to the predetermined threshold, in S204, the apparatus may compare the reflection values S1 and S2.

When the reflection values S1 and S2 are similar to each other, the apparatus may determine the target object as the vehicle.

Furthermore, when a difference value between the reflection values S1 and S2 is less than a predetermined reference value, the apparatus may determine the target object as a two-wheeled vehicle (e.g., a bicycle or a motorcycle). Meanwhile, when the difference value between the reflection values S1 and S2 is greater than or equal to the predetermined reference value, the apparatus may determine that the target object is a pedestrian or is in an error state.

Thus, in S205, the apparatus may control the host vehicle in response to a type of the target object. For example, when the target object is a two-wheeled vehicle, because there is a high probability that the target object will suddenly cut in front of the host vehicle, the apparatus may perform control of stopping the host vehicle. Furthermore, when the target object is a large truck, because there is a high probability that the target object will slowly cut in front of the host vehicle, the apparatus may perform deceleration control of the host vehicle rather than stop the host vehicle.

As such, an embodiment of the present disclosure may recognize a type of the target object depending on the amount of signal reflection of the ultrasonic sensor and may perform autonomous driving depending on the type of the target object. Thus, reliability of autonomous driving control may be improved.

Figure 12:
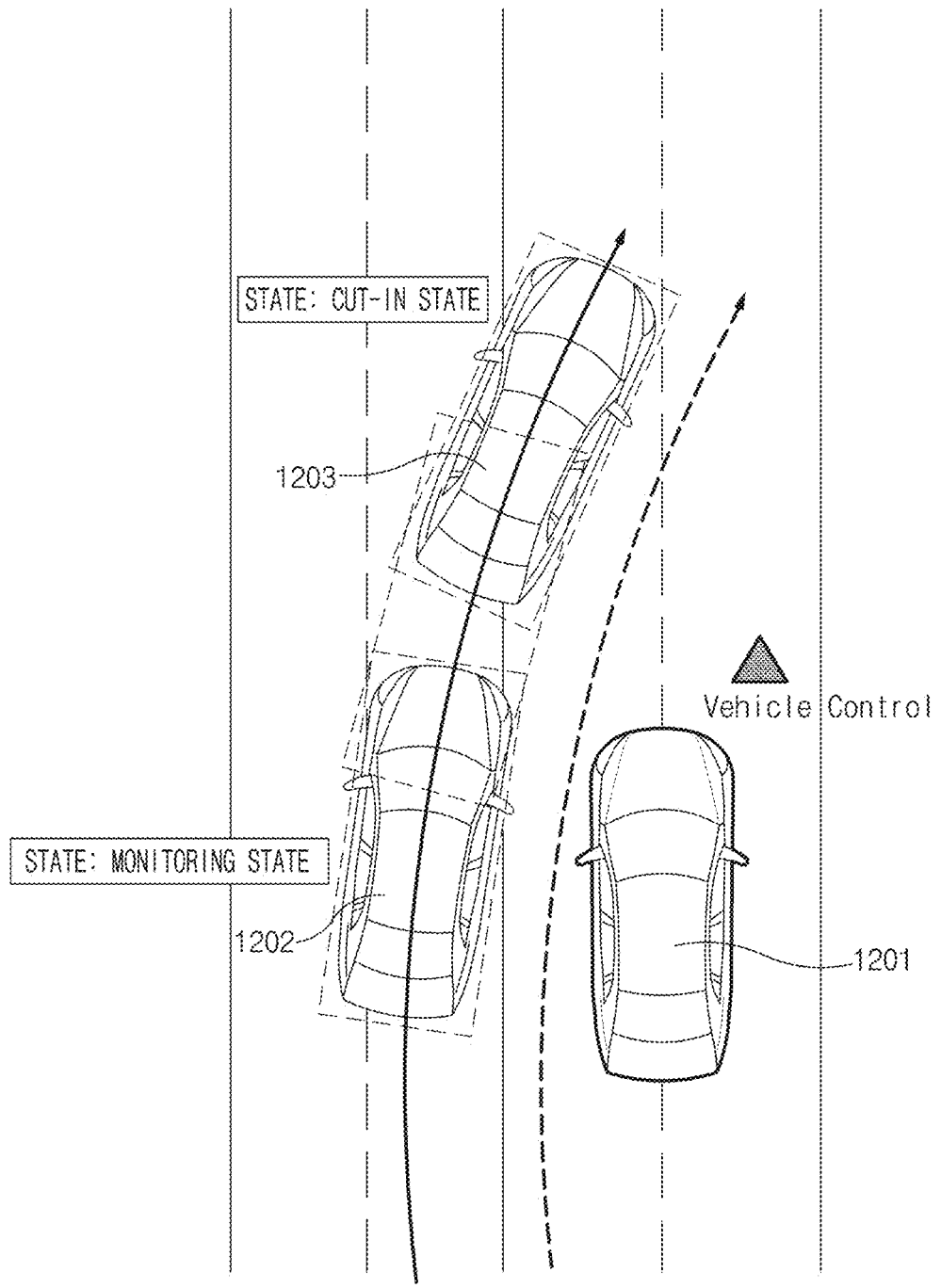
FIG. 12 is a drawing illustrating an example of cutting in according to an embodiment of the present disclosure.
Figure 13:
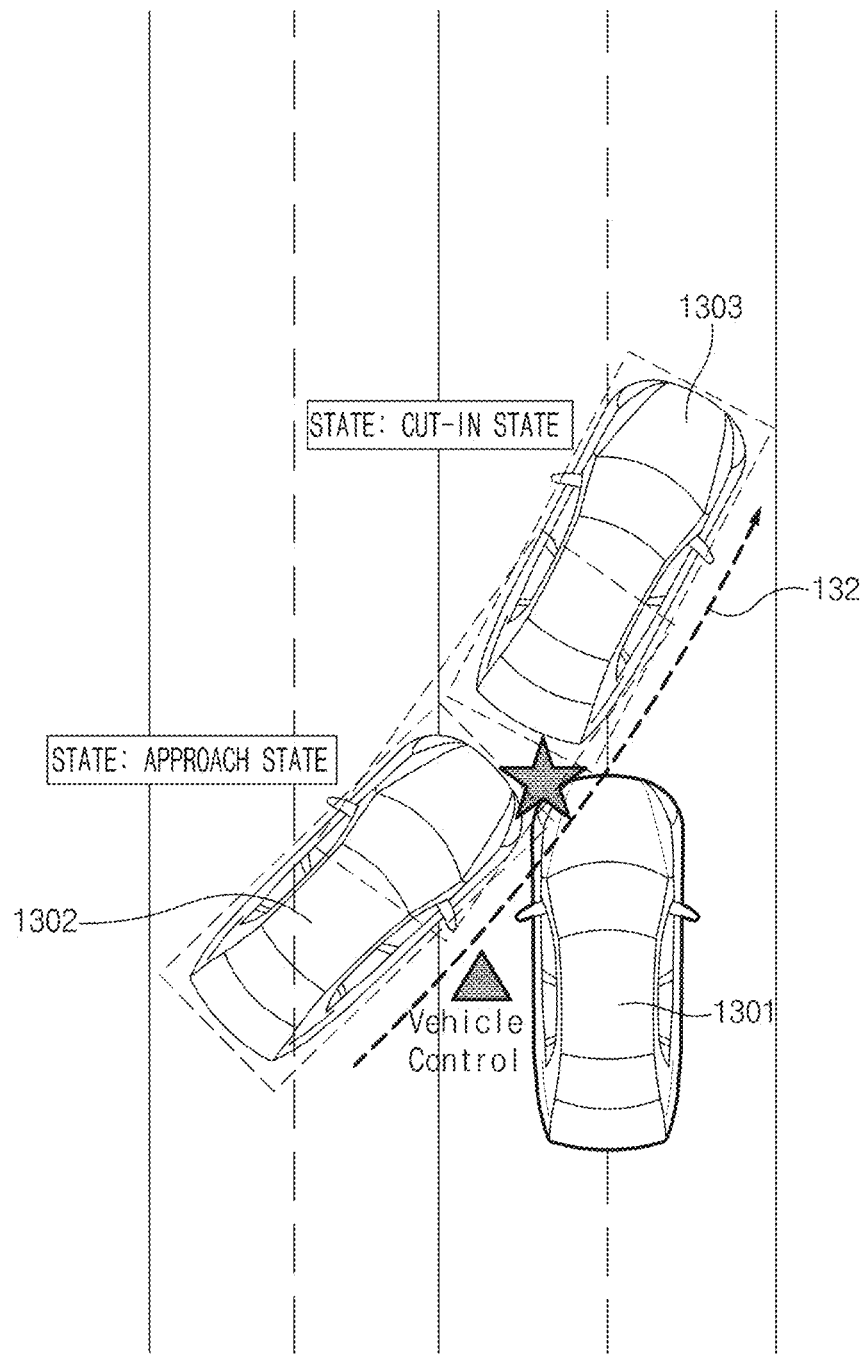
FIG. 13 is a drawing illustrating an example of cutting in according to an embodiment of the present disclosure.

FIG. 12 is a drawing illustrating an example of cutting in according to an embodiment of the present disclosure. FIG. 13 is a drawing illustrating an example of cutting in according to an embodiment of the present disclosure.

As shown in FIG. 12, when a distance from a target object 1202, which is approaching a host vehicle 1201 at the left of the host vehicle 1201, is greater than or equal to a certain distance, while maintaining a monitoring state, an autonomous controller 100 of FIG. 1 may estimate that the target object 1202 is making a turn to the front 1203 of the host vehicle 1021 and cutting in front of the host vehicle 1201. The autonomous controller 100 may perform control of making a lane change of the host vehicle 1201 to a right lane so that the host vehicle 1201 would not collide with the target object 1202.

As shown in FIG. 13, when a target object enters a cut-in state 1303 from an approach state 1302, because a collision may occur at an edge of a host vehicle 1301, an autonomous controller 100 of FIG. 1 may perform stop control of the host vehicle 1301.

Figure 14:
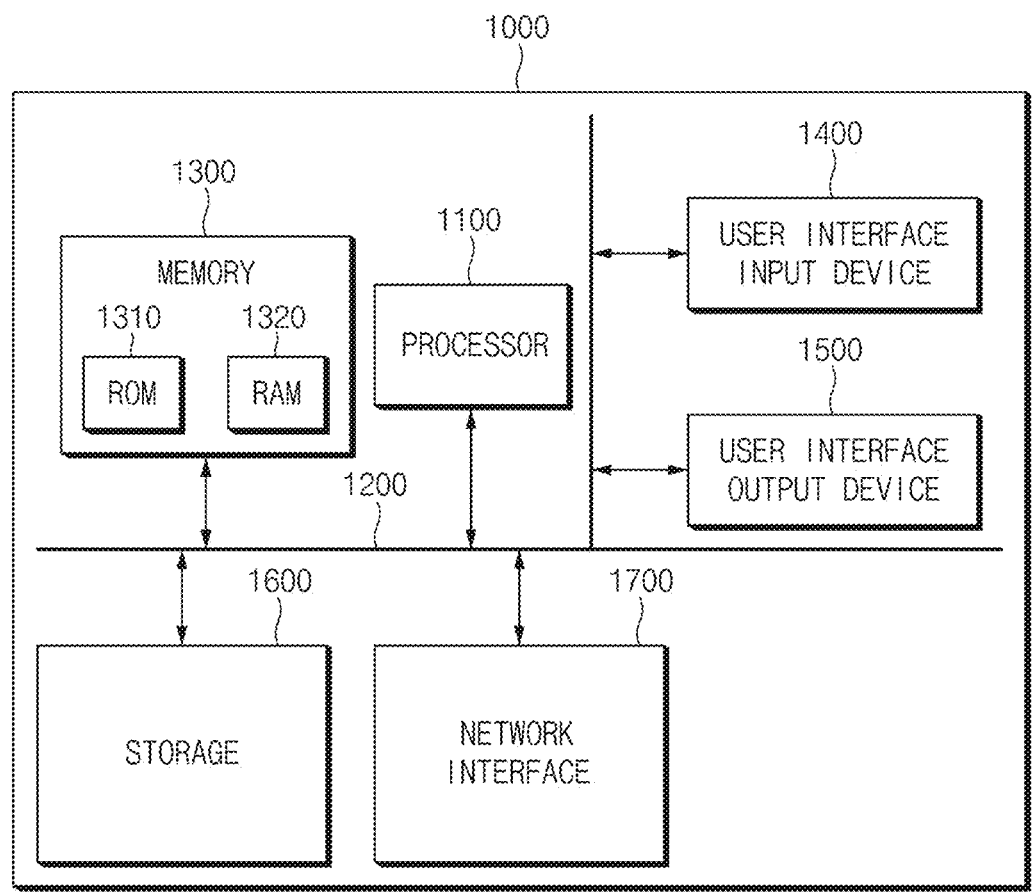
FIG. 14 is a block diagram illustrating a computing system according to an embodiment of the present disclosure.

FIG. 14 is a block diagram illustrating a computing system according to an embodiment of the present disclosure.

Referring to FIG. 14, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (e.g., the memory 1300 and/or the storage 1600), such as a RAM, a flash memory, a ROM, an EPROM, an EEPROM, a register, a hard disk, a removable disk, and a CD-ROM.

The storage medium may be coupled to the processor 1100, and the processor 1100 may read information out of the storage medium and may record information in the storage medium. In another embodiment, the storage medium may be integrated with the processor 1100. The processor 1100 and the storage medium may reside in an application specific integrated circuit (ASIC). The ASIC may reside within a user terminal. In another embodiment, the processor 1100 and the storage medium may reside in the user terminal as separate components.

The present technology may accurately detect a type of a low-speed target object as well as whether the low-speed target object is in a cut-in state in a congested situation during autonomous driving and may perform vehicle control corresponding to the target object.

In addition, various effects or advantages ascertained directly or indirectly through the present disclosure may be provided.

Hereinabove, although the present disclosure has been described with reference to specific embodiments and the accompanying drawings, the present disclosure is not limited thereto. However, the present disclosure may be variously modified and altered by those having ordinary skill in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An autonomous controller, comprising:
a processor configured to detect a target object attempting to cut in at a speed below a predetermined threshold during autonomous driving and perform response control; and
a storage storing data and an algorithm for detecting the target object and performing the response control,
wherein the processor calculates a final distance value on the basis of a point tracking a changed value of a first distance and a third distance between a host vehicle and the target object and compares the final distance value with a first threshold to determine whether the target object is in a cut-in state,
wherein the processor is configured to:
calculate the first distance from a first sensor of the plurality of sensors to a point where a perpendicular reference line from the first sensor to the target object meets a first point on a side surface of the target object and calculate a second distance from a second sensor of the plurality of sensors to a point where another perpendicular reference line from the second sensor to the target object meets a second point on the side surface of the target object;
calculate as the third distance a distance from a reference line, extending from a position of the first sensor along a length direction of the host vehicle, to the second point;
track the first distance and the third distance;
compare the tracked first distance and the tracked third distance; and
determine as the final distance value a shorter distance between the tracked first distance and the tracked third distance.

2. The autonomous controller of claim 1, wherein the processor controls the host vehicle depending on whether the target object is in the cut-in state.

3. The autonomous controller of claim 1, wherein the processor determines whether the final distance value is less than or equal to the first threshold and determines that the target object is in the cut-in state when the final distance value is less than or equal to the first threshold.

4. The autonomous controller of claim 3, wherein the processor determines whether the final distance value is greater than the first threshold and is less than or equal to a second threshold and determines that the target object is in an approach state when the final distance value is greater than the first threshold and is less than or equal to the second threshold.

5. The autonomous controller of claim 4, wherein the processor determines whether the final distance value is greater than the second threshold and is less than or equal to a third threshold and determines that the target object is in a monitoring state for monitoring approach when the final distance value is greater than the second threshold and is less than or equal to the third threshold.

6. The autonomous controller of claim 5, wherein the processor performs stop control of the host vehicle when the target object is in the cut-in state, performs deceleration control of the host vehicle when the target object is in the approach state, and continues tracking the first distance and the third distance between the host vehicle and the target object when the target object is in the monitoring state.

7. The autonomous controller of claim 1, wherein the processor calculates reflection values for each of a plurality of sensors with respect to the target object based on sensed information.

8. The autonomous controller of claim 7, wherein the processor compares the reflection values for each of the plurality of sensors to determine a type of the target object.

9. The autonomous controller of claim 8, wherein the processor controls the host vehicle using at least one of whether the target object is in the cut-in state, a movement angle of the target object, a relative speed of the target object, and the type of the target object.

10. The autonomous controller of claim 8, wherein the processor determines the target object as a non-two-wheeled vehicle when the reflection values for each of the plurality of sensors are greater than or equal to a predetermined reflection value threshold and determines the target object as a two-wheeled vehicle or a pedestrian depending on a difference between the reflection values for each of the plurality of sensors.

11. The autonomous controller of claim 8, wherein the processor performs deceleration control of the host vehicle when the target object is a non-two-wheeled vehicle and performs stop control of the host vehicle when the target object is a two-wheeled vehicle.

12. A system, comprising:
a sensing device configured to sense information of a target object around a host vehicle; and
an autonomous controller configured to detect the target object attempting to cut in at a speed below a predetermined threshold during autonomous driving and perform response control, based on the sensed information of the sensing device,
wherein the autonomous controller calculates a final distance value on the basis of a point tracking a changed value of a first distance and a third distance between the host vehicle and the target object and compares the final distance value with a first threshold to determine whether the target object is in a cut-in state,
wherein the sensing device includes a plurality of ultrasonic sensors,
wherein the autonomous controller is configured to:
calculate the first distance from a first sensor of the plurality of sensors to a point where a perpendicular reference line from the first sensor to the target object meets a first point on a side surface of the target object and calculate a second distance from a second sensor of the plurality of sensors to a point where another perpendicular reference line from the second sensor to the target object meets a second point on the side surface of the target object;
calculate as the third distance a distance from a reference line, extending from a position of the first sensor along a length direction of the host vehicle, to the second point;
track the first distance and the third distance;
compare the tracked first distance and the tracked third distance; and
determine as the final distance value a shorter distance between the tracked first distance and the tracked third distance.

13. The system of claim 12, wherein the plurality of sensors are located on front portions and corners of the host vehicle.

14. The system of claim 12, wherein the autonomous controller calculates reflection values of the plurality of ultrasonic sensors for the target object and determines a type of the target object using the reflection values.

15. An autonomous control method, comprising:
sensing a first distance and a third distance between a host vehicle and a target object based on a plurality of sensors during driving at a speed below a predetermined threshold;
tracking a changed value of the first distance and the third distance between the host vehicle and the target object; and
determining whether the target object is in a cut-in state, using tracked distance values,
wherein the tracking the changed value of the first distance and the third distance between the host vehicle and the target object includes:
calculating the first distance from a first sensor of the plurality of sensors to a point where a perpendicular reference line from the first sensor to the target object meets a first point on a side surface of the target object and calculating a second distance from a second sensor of the plurality of sensors to a point where another perpendicular reference line from the second sensor to the target object meets a second point on the side surface of the target object;
calculating as the third distance a distance from a reference line, extending from a position of the first sensor along a length direction of the host vehicle, to the second point;
tracking the first distance and the third distance;
comparing the tracked first distance and the tracked third distance; and
determining as the final distance value a shorter distance between the tracked first distance and the tracked third distance.

16. The autonomous control method of claim 15, further comprising:
calculating reflection values of the plurality of sensors with respect to the target object;
determining a type of the target object using the reflection values of the plurality of sensors; and
controlling the host vehicle using at least one of whether the target object is in the cut-in state, a movement angle of the target object, a relative speed of the target object, and the type of the target object.

* * * * *